United States Patent
Drury

[11] Patent Number: 5,430,906
[45] Date of Patent: Jul. 11, 1995

[54] BICYCLE TIRE SCRAPER

[76] Inventor: Michael P. Drury, 366 A Tower Hill Rd., North Kingstown, R.I. 02852

[21] Appl. No.: 21,144

[22] Filed: Feb. 23, 1993

[51] Int. Cl.[6] .............................................. A46B 17/02
[52] U.S. Cl. ........................................ 15/160; 15/246; 280/158.1
[58] Field of Search ...................... 15/246, 256.5, 160, 15/256.51, 104.52, 104.53; 280/158.1, 855, 288.4

[56] References Cited

U.S. PATENT DOCUMENTS

| | | | |
|---|---|---|---|
| 185,660 | 12/1876 | Bacon | 15/246 |
| 477,504 | 6/1892 | Bunker . | |
| 597,471 | 1/1898 | Nutsford | 280/158.1 |
| 597,527 | 1/1898 | Peate et al. . | |
| 649,824 | 5/1900 | Druschky | 280/158.1 |
| 671,320 | 4/1901 | Hixon, Jr. | 15/160 |
| 719,608 | 2/1903 | Peterson . | |
| 979,699 | 12/1910 | Prince . | |
| 1,266,418 | 5/1918 | Dawson | 280/158.1 |
| 2,407,473 | 9/1946 | Carlton | 280/158.1 |
| 4,168,080 | 9/1979 | Poe . | |
| 4,605,239 | 8/1986 | Warfel | 15/246 |

FOREIGN PATENT DOCUMENTS

| | | | |
|---|---|---|---|
| 0523880 | 8/1921 | France | 280/158.1 |
| 0850128 | 12/1939 | France | 280/158.1 |
| 2581953 | 11/1986 | France . | |
| 0480330 | 8/1925 | Germany | 280/158.1 |

Primary Examiner—David A. Scherbel
Assistant Examiner—James F. Hook
Attorney, Agent, or Firm—Richard C. Litman

[57] ABSTRACT

A bicycle tire scraper for removing debris from a bicycle tire. The scraper includes a brush movably attached to a brush arm which selectively engages the brush with the tire. A collar is attachable to the bicycle frame and supports the brush arm in a pivotally fixed position relative to the frame. Upon a pivotal displacement of the brush arm, the brush engages the tire. Upon release of the brush arm, a return spring returns the brush arm to an initial position away from the tire and, in turn, returns the brush to a position out of engagement with the tire. A brush arm stop limits the return of the brush arm to the initial position. The brush arm may be depressed either directly via a lever arm extending from the brush arm or indirectly via a cable displaceable by a remote lever arm. A brush stop limits the radial movement of said brush to ensure adequate surface contact between the brush and the circumference of the tire. Moreover, a lateral brush slide is attached to the brush to provide a limited axial movement of the brush relative to the brush arm to ensure that the brush is permitted to slide laterally to align itself with the tread of the tire.

16 Claims, 5 Drawing Sheets

BICYCLE TIRE SCRAPER

BACKGROUND OF THE INVENTION

1. Field of the Invention

The present invention relates to an attachment for wheeled land vehicles and more particularly, to a velocipede type wheel scraper and cleaner for use with bicycles.

2. Description of the Prior Art

A cycling enthusiast, especially a competitor in a cycling event, such as a racing event, is primarily interested in areas of performance such as control, speed, and agility. Safety is a another factor of importance in competitive cycling. In road and criterium racing, the cyclists spend an overwhelming amount of time in large or small groups, often shoulder to shoulder and wheel to wheel. Periodically the cyclist may be so inclined as to scrape debris from his or her tire. This is most frequently accomplished through the cyclist displacing himself or herself to the side of the bicycle so as to access the tire and manually clean the same. This activity may disrupt the cyclists balance causing the cyclist to swerve and strike another cyclist or expose his or her body parts to moving parts, jeopardizing the safety of himself or herself as well as neighboring cyclists.

A fixedly attached brush assembly which facilitates in the removal from the tire road debris could reduce the risk of a hazardous situation occurring. Brush assemblies or components intended for this purpose have long been devised. One such assembly is shown in U.S. Pat. No. 477,504, issued Jun. 21, 1892 to William I. Bunker, which describes a wheel-guard having a structure which is purposed to be rigidly attached to the frame of a bicycle and which supports a brush for cleaning the periphery of the tire and a guard for arresting upwardly projecting particles. This wheel-guard is large and cumbersome and thereby heavy and highly conducive to producing drag. Furthermore, the wheel guard makes substantially continuous contact with the periphery of the tire and thereby, offers greater resistance to the movement of the tire as well as an increased wear of the same.

Similar to the aforementioned wheel-guard described by Bunker, a bicycle attachment for scraping tires is disclosed in U.S. Pat. No. 597,527, issued Jan. 18, 1898 to Alfred M. Peate et al., describing a frame for carrying a scraper. The frame is connectable to the front and/or rear forks of a bicycle. In addition to the disadvantages in the above mentioned patent to Bunker, the scraper necessitates removal prior to the removal of the tire.

An alternative attachment is shown in U.S. Pat. No. 979,699, issued Dec. 27, 1910 to Thomas H. Prince, disclosing a puncture guard for pneumatic tires which includes a pair of jaws, each attachable to the forks of a bicycle. The jaws cooperatively support a U-shaped segment of spring metal which spans the treads of the tire. The jaws and the hardware for attaching the same to the frame add unnecessary weight to the bicycle. Further, the U-shaped segment of spring metal is fixed a predetermined distance from the tire surface and therefore provides little assurance that relatively small particles of debris will be removed from the tire. It should be noted that the segment of U-shaped spring metal would more likely than not have to be varied with a variation in the width of the tire.

Yet another scraper is shown for scraping debris from a bicycle tire in U.S. Pat. No. 4,168,080, issued Sep. 18, 1979 to Michael E. Poe, describing a planar blade detachably secured to the frame of a bicycle. An edge of the blade is positioned adjacent the outer circumference of the bicycle tire. Similar to the scraper of Prince described above, this scraper does not communicate with the tire and hence, is not likely to remove relatively small particles of debris from the tire.

Unlike the above mentioned patents, U.S. Pat. No. 719,608, issued Feb. 3, 1903 to John M. Peterson, discloses an automatic bicycle brush-supporting device operable from an upper portion of the bicycle frame. The device includes a frame for supporting a the brush in and out of contact with the tire of a bicycle. This device is also big and bulky and suffers the disadvantages associated with these two characteristics. Moreover, this device employs a considerably number of moving parts, increasing the likelihood of mechanical breakdown identified with wear. Like the Peterson patent above, French Patent Application No. 2 581 953 A1, published Nov. 21, 1986, also shows a cable activated tire scraping brush assembly. This scraping assembly is shown affixed to a bicycle fender. The bicycle frame may not accommodate this scraping assembly and the obsolescence of fenders on competition bicycles may render this scraper useless.

None of the above inventions and patents, taken either singly or in combination, is seen to describe the instant invention as claimed.

SUMMARY OF THE INVENTION

The present invention is a bicycle tire scraper comprising a brush, a brush arm, and a collar. The brush removes debris from a tire of a bicycle. The brush is movably attached to the brush arm which selectively engages the brush with the tire. The collar is attachable to a frame appendage of the bicycle and supports the brush arm in a pivotally fixed position relative to the appendage of the bicycle frame. Upon a pivotal displacement of the brush arm, the brush engages the tire. A return spring applies a force to bias the brush arm to return the brush arm to an initial position away from the tire and, in turn, return the brush to a position out of engagement with the tire. A brush arm stop extends form the collar and is engagable with the brush arm to limit the return of the brush arm to the initial position. Preferably, a lever arm is provided which when depressed, pivotally displaces the brush arm toward the tire to engage the brush with the same. As the lever arm is depressed, the return spring is displaced to a state of flexion. Upon release of the lever arm, the force applied by the return spring returning back to a state of relaxation displaces the brush arm to return the brush arm to its initial position. A brush stop may be located the end of the brush arm proximate to the brush. The brush stop limits the radial movement of said brush to ensure adequate surface contact between the brush and the circumference of the tire. Moreover, a lateral brush slide is attached to the brush to provide a limited axial movement of the brush relative to the brush arm to ensure that the brush is permitted to slide laterally to align itself with the tread of the tire.

An alternative bicycle tire scraper includes a lever arm pivotally attached to a collar which, in turn, is firmly attached to the frame appendage of the bicycle. A cable has one end attached to the lever arm and an opposite end attached to the brush arm. By displacing the lever arm, the cable is slidably and axially displaced to pivotally displace the brush arm to engage the brush with the tire. Aside, from the cable actuation, the operation of the second alternative is the same.

Accordingly, it is a principal object to provide a bicycle tire scraper for removing debris from a tire of a bicycle having a brush movably attached to the brush arm which selectively engages the brush with the tire thereby avoiding constant communication between the brush and the tire surface.

It is another object to provide a bicycle tire scraper which is attachable to a frame appendage of the bicycle in a location which utilizes the appendage as a foil to deflect air flow and thereby reduce drag.

It is a further object to provide a biasing mechanism which applies a force to bias the brush out of engagement with the tire and a stop mechanism which limits the return of the brush to an initial position.

Still another object is to provide a brush stop for limiting the radial movement of the brush to ensure adequate surface contact between the brush and the circumference of the tire.

Yet another object is to provide a lateral slide mechanism for limiting an axial movement of the brush so as to ensure that the brush is permitted to slide laterally to align itself with the tread of the tire.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
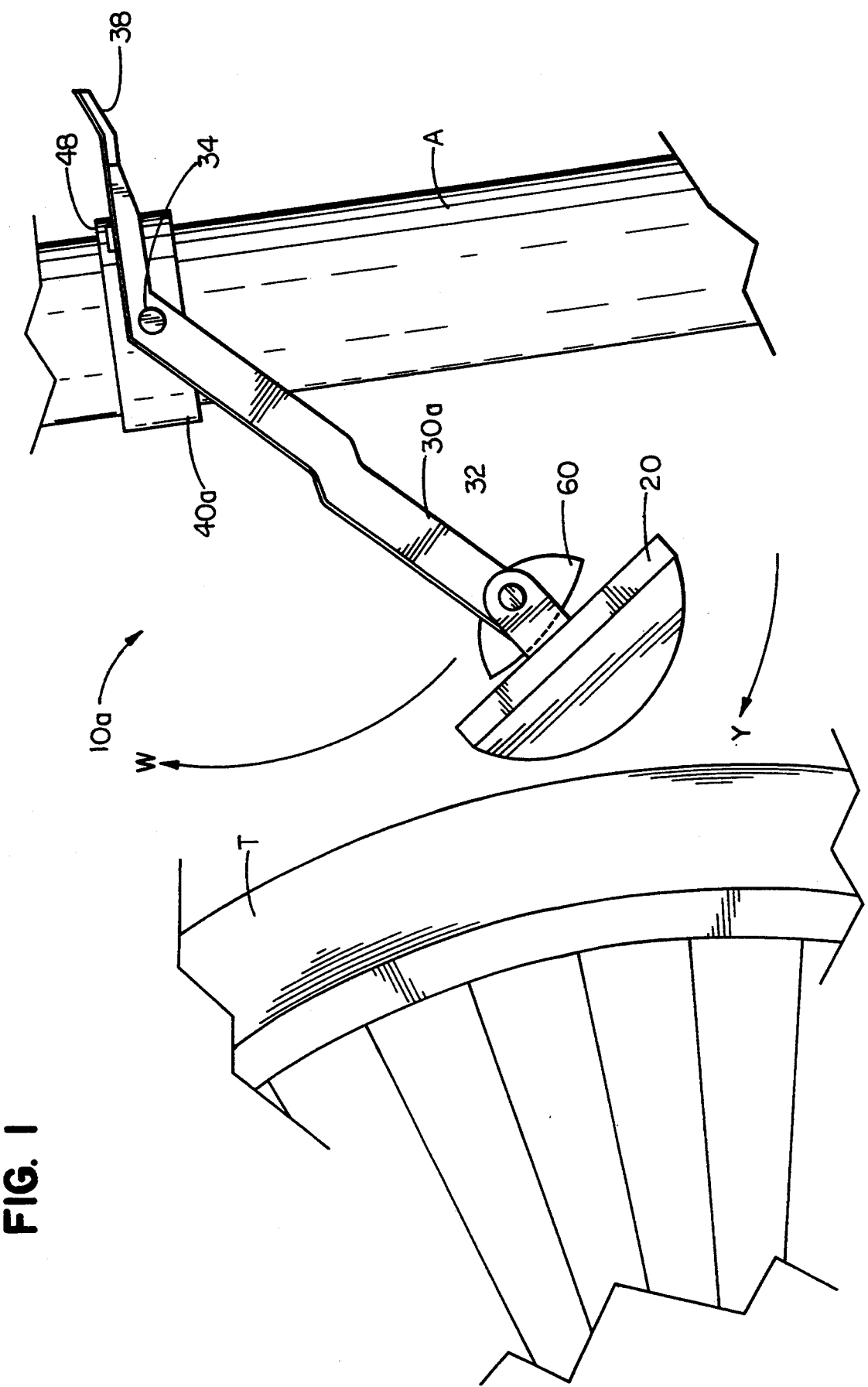
FIG. 1 is an environmental side elevational view of a bicycle tire scraper according to the present invention.

The present invention, as shown in FIG. 1, is a bicycle tire scraper 10a comprising a brush 20, a brush arm 30a, and a collar 40a. The brush 20 facilitates removing debris (not shown) from a tire T of a bicycle (also not shown). The brush arm 30a has a first end 32 and a second end 34. The brush 20 is movably attached to the first end 32 of the brush arm 30a. The brush arm 30a selectively engages the brush 20 with the tire T of the bicycle. The collar 40a is attachable to a frame appendage A of the bicycle. The second end 34 of the brush arm 20 is pivotally attached to the collar 40a. The collar 40a supports the brush arm 20 in a pivotally fixed position relative to the appendage A of the bicycle frame. The operation is simple. Upon a pivotal displacement of the brush arm 30a in the direction W, the brush 20 engages the tire T of the bicycle. The engagement is more clearly shown in FIGS. 2 and 3. A movement of the brush arm 30a in a direction opposite to the direction W disengages the brush 20 from tire T of the bicycle, as is shown in FIG. 1.

Figure 4:
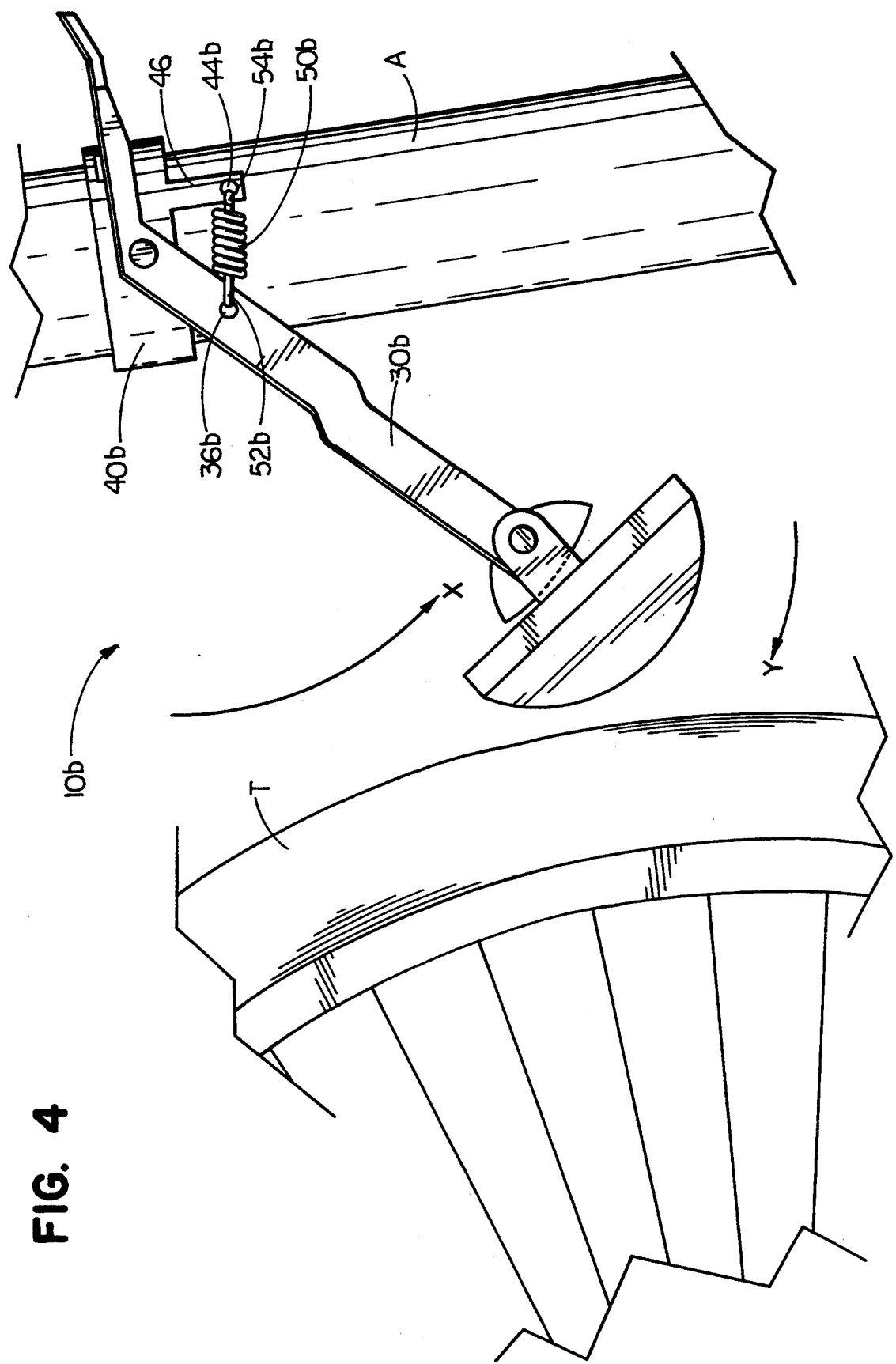
FIG. 4 is an environmental side elevational view of a first alternative bicycle tire scraper.

Referring again to FIG. 2, the bicycle tire scraper 10a is shown to include a torsional return spring 50a carried by a pivot pin 42. The return spring 50a has a first end 52a joined to the brush arm 30a by engaging a hole 36a in the brush arm 30a and a second end 54a joined to the collar 40a by engaging a hole 44a in the collar 40a. The return spring 50a applies a force to bias the brush arm 30a to displace the brush arm 30a in a direction opposite to the direction W to return the brush arm 30a to a position, as shown in FIG. 1, away from the tire T of the bicycle and, in turn, return the brush 20 to a position out of engagement with the tire T of the bicycle. An alternative bicycle scraper 10b is shown in FIG. 4 having a return tension spring 50b. This return spring 50b has a first end 52b joined to the brush arm 30b by engaging a hole 36b in the brush arm 30b and a second end 54b joined to the collar 40b by engaging a hole 44b in a leg 46 extending downwardly from the collar 40b. Similar to that of the first embodiment, this return spring 50b applies a force to bias the brush arm 30b in a direction X to displace the brush arm 30b to return the brush arm 30b to the position away from the tire T of the bicycle and, in turn, return the brush 20 to the position out of engagement with the tire T of the bicycle. It should be noted that the operation of the alternative bicycle tire scraper 10b corresponds to that of the bicycle tire scraper 10a. Hence, a duplicate description will be omitted.

Figure 2:
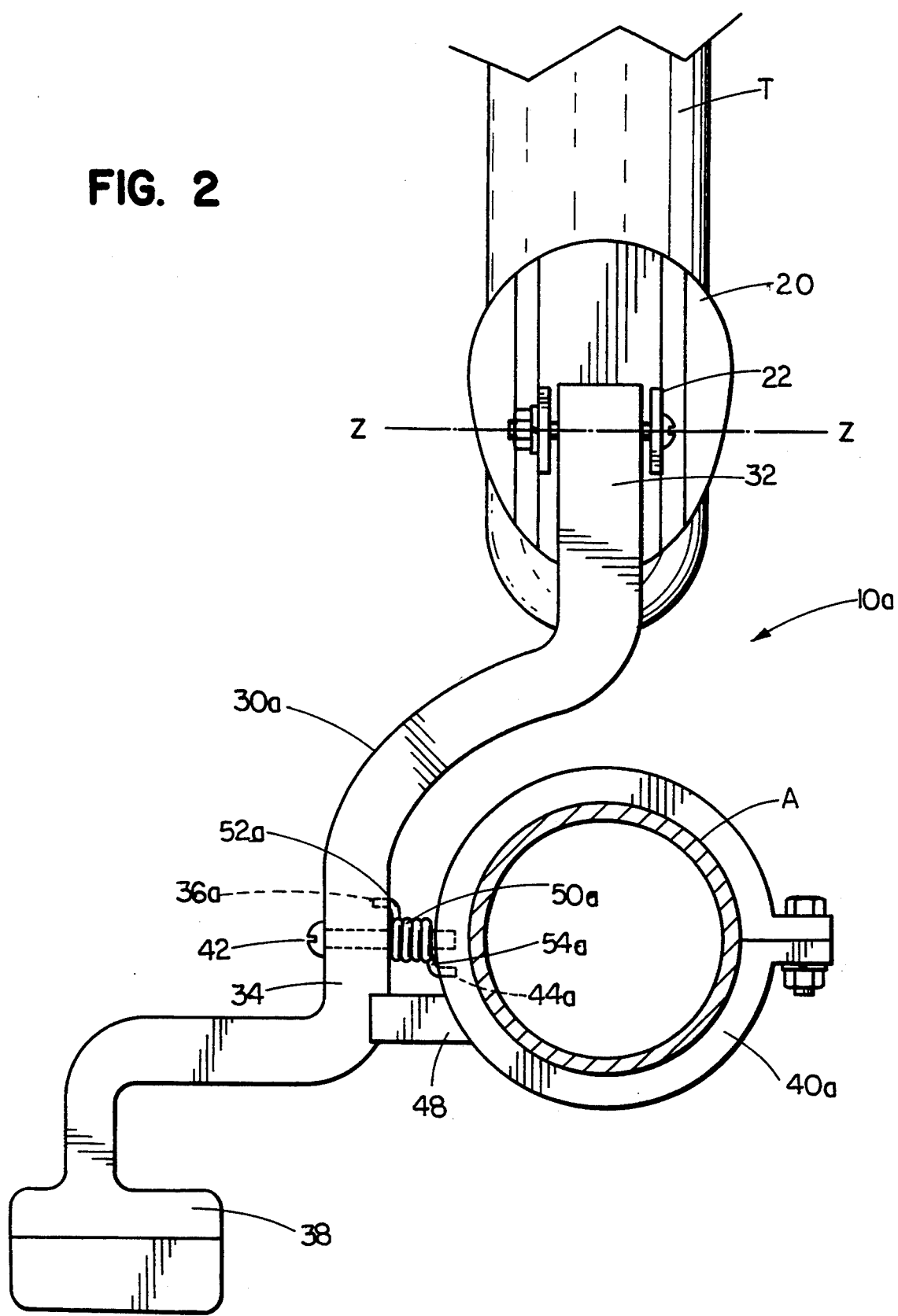
FIG. 2 is an environmental top plan of the bicycle tire scraper shown in FIG. 1.

Referring to FIGS. 1 and 2, the collar 40a of the bicycle tire scraper 10a is shown to further include a brush arm stop 48 extending therefrom. The brush arm stop 48 is engagable with the brush arm 30a. The purpose of the brush arm stop 48 limits the return of the brush arm 30a in the direction opposite to the direction W to the position away from the tire T of the bicycle.

The bicycle tire scraper 10a further includes a lever arm 38 which extends from the second end 34 of the brush arm 30a. The lever arm 38 is depressed to pivotally displace the brush arm 30a in the direction W toward the tire T of the bicycle to engage the brush 20 with the same. As the lever arm 38 is depressed, the return spring 50a (shown in FIG. 2) is displaced to a state of flexion. Upon release of the lever arm 38, the force applied by the return spring 50a returning back to a state of relaxation displaces the brush arm 30a to return the brush arm 30a to the position away from the tire T of the bicycle and, in turn, return the brush 20 to the position out of engagement with the tire T of the bicycle.

As shown in FIG. 1, a brush stop 60 is located at the first end 32 of the brush arm 30a. The brush stop 60 functions to limit the radial movement of the brush 20 in the direction Y. This ensures adequate surface contact between the brush 20 and the circumference of the tire T of the bicycle during its rotation.

Figure 3:
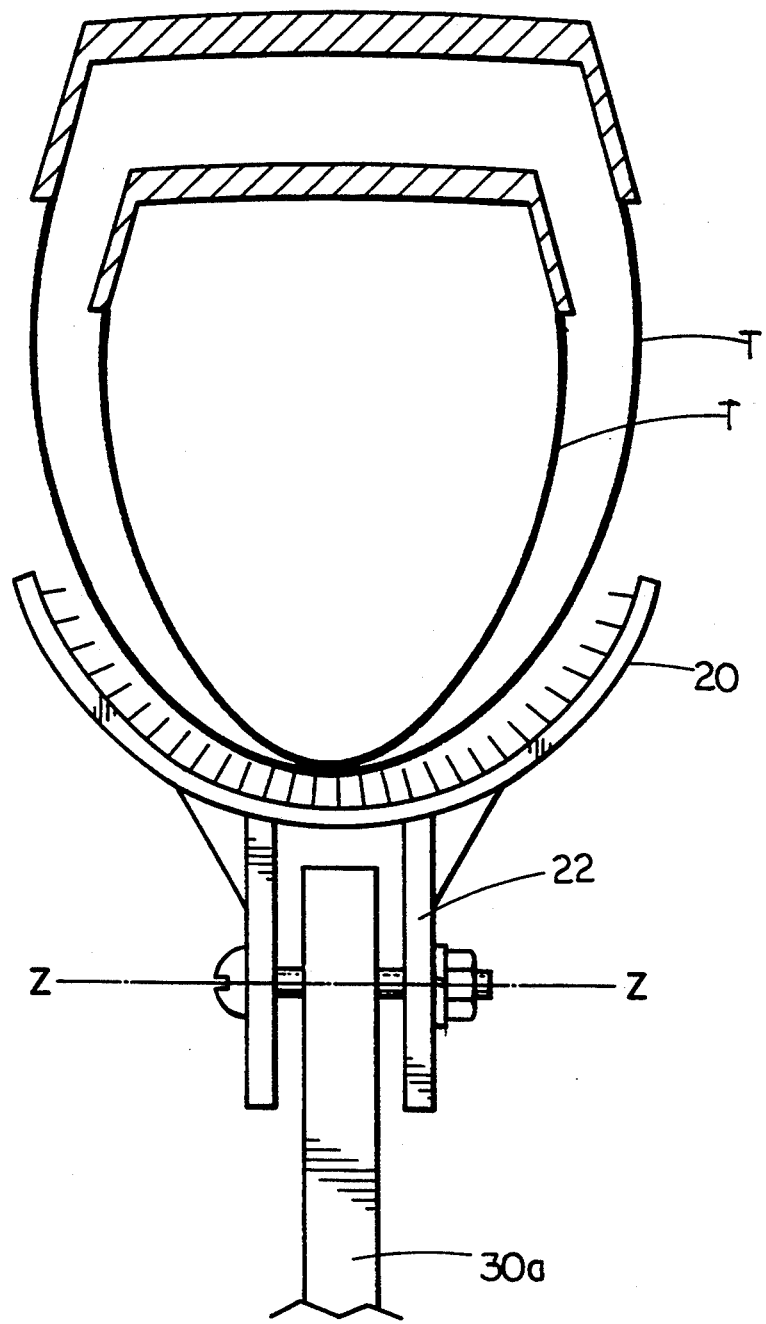
FIG. 3 is another environmental top plan of the brush of the bicycle tire scraper.

Referring to FIGS. 2 and 3, the bicycle tire scraper 10a also includes a lateral brush slide 22 attached to the brush. The lateral side 22 movably attaches the brush 20 to the brush arm 30a so as to provide a limited axial movement of the brush 20 relative to the brush arm 30a and, in turn, relative to the tire T. This ensures that the brush 20 is permitted to slide laterally along the line Z—Z to align itself with the tread of the tire T, T' of the bicycle, as is shown more specifically in FIG. 4.

Figure 5:
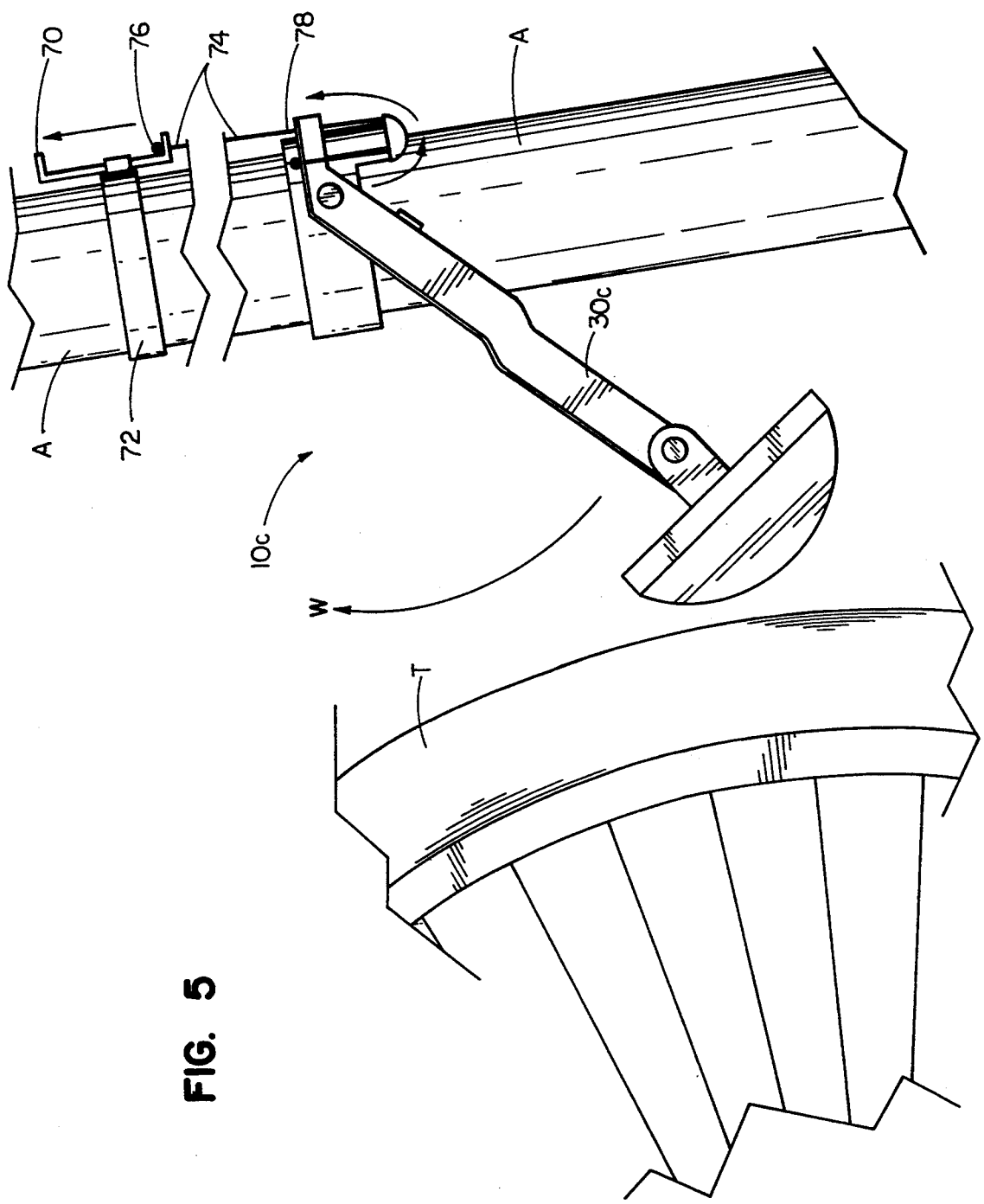
FIG. 5 is an environmental side elevational view of a second alternative bicycle tire scraper.

A second alternative bicycle tire scraper 10c is shown in FIG. 5. Unlike the first two embodiments, this embodiment includes a lever arm 70 pivotally attached to a collar 72 which, in turn, is firmly attached to the frame appendage A of the bicycle. A cable 74 has a first end 76 attached to the lever arm 72 in a conventional manner. A second end 78 of the cable 74 is attached to the brush arm 30c in a manner similar to the attachment of the first end 76. By displacing the lever arm 70 upwardly, the cable is slidably and axially displaced and the brush arm 30c is pivotally displaced in the direction W toward the tire T of the bicycle to engage the brush 20 therewith. Aside, from the cable actuation, the operation of the second alternative is the same as that of the first two aforementioned embodiments and is therefore omitted.

It is to be understood that the present invention is not limited to the embodiments described above, but encompasses any and all embodiments within the scope of the following claims.

I claim:

1. A bicycle tire scraper mounted on a bicycle, comprising:
    a scraper for removing debris from a bicycle tire;
    an arm having a first end and a second end, said scraper attached to said first end of said arm, said arm dimensioned and configured for selectively engaging said scraper with the bicycle tire;
    a means for pivotally supporting said second end of said arm, said pivotal support means attachable to a frame appendage of the bicycle for supporting said arm in a pivotally fixed position relative to the appendage of the bicycle frame, whereby said arm is pivotally displaceable to engage and disengage said scraper from the bicycle tire;
    including means for returning said arm and said scraper to a position out away from the bicycle tire; and
    including an arm stop extending from said pivotal support means and engageable with said arm, said arm stop limiting travel of said arm upon the return of said arm to the position away from the bicycle tire.

2. A bicycle tire scraper according to claim 1, wherein said scraper includes a bristle brush.

3. A bicycle tire scraper according to claim 1, further including means for movably attaching said scraper to said first end of said arm.

4. A bicycle tire scraper according to claim 3, further including a means for limiting a radial movement of said scraper located at said first end of said arm.

5. A bicycle tire scraper according to claim 3, wherein said means for movably attaching said scraper includes means for limiting a lateral movement of said scraper relative to said arm and, in turn, relative to the bicycle tire.

6. A bicycle tire scraper according to claim 1, wherein said pivotal support means includes a collar.

7. A bicycle tire scraper according to claim 1, wherein said returning means includes a spring having one end joined to said arm and the other end joined to said pivotal support means, whereby
    upon displacement of said arm to engage said scraper with the bicycle tire, said spring is displaced to a state of flexion, and upon a release of said arm, said spring returns to a state of relaxation, thus returning said arm to the position away from the bicycle tire and, in turn, returning said scraper to the position out of engagement with the bicycle tire.

8. A bicycle tire scraper according to claim 1, further including a lever extending from said second end of said arm, said lever for manually displacing said arm toward the bicycle tire so as to engage said scraper with the bicycle tire.

9. A bicycle tire scraper according to claim 1, further including:
    a lever for pivotally displacing said arm toward the bicycle tire to engage said brush with the bicycle tire;
    means for attaching said lever to a frame appendage of the bicycle, said lever being pivotally attached to said attachment means; and
    means for pivotally displacing said arm relative to a displacement of said lever so as to engage and disengage said scraper with the bicycle tire.

10. A bicycle tire scraper according to claim 9, wherein said pivotal displacing means includes an axially slidable cable having a first end and a second end, said first end of said cable being joined to said lever and said second end of said cable being joined to said second end of said arm, whereby
    a displacement of said lever displaces said cable which, in turn, pivotally displaces said arm toward the tire of the bicycle so as to engage said removal means with the tire of the bicycle.

11. A bicycle tire scraper mounted on a bicycle comprising:
    a brush for removing debris from a bicycle tire;
    an arm having a first end and a second end, said brush being movably attached to said first end of said arm, said arm being dimensioned and configured for selectively engaging said brush with the bicycle tire;
    a collar attachable to a frame appendage of the bicycle, said second end of said arm being pivotally attached to said collar, said collar for supporting said arm in a pivotally fixed position relative to the appendage of the bicycle frame, whereby said arm is pivotally displaceable to engage and disengage said brush from the bicycle tire;
    including a return spring having a first end joined to said arm and a second end joined to said collar, said return spring for returning said arm and said brush to a position away from the bicycle tire; and
    including an arm stop extending from said collar and engageable with said arm, said arm stop for limiting the return of said arm to the position away from the bicycle tire.

12. A bicycle tire scraper according to claim 11, further including a lever arm extending from said second end of said arm, said lever arm for pivotally displacing said arm toward the bicycle tire to engage said brush with the bicycle tire.

13. A bicycle tire scraper according to claim 11, further including:
    a lever arm for pivotally displacing said arm toward the bicycle tire to engage said brush with the bicycle tire;
    means for attaching said lever arm to a frame appendage of the bicycle, said lever arm being pivotally attached to said attachment means; and
    means for pivotally displacing said arm relative to a displacement of said lever arm so as to engage and disengage said brush from the bicycle tire.

14. A bicycle tire scraper according to claim 13, wherein said pivotal displacing means includes an axially slidable cable having a first end and a second end, said first end of said cable being joined to said lever arm and said second end of said cable being joined to said second end of said brush arm, whereby a displacement of said lever arm displaces said cable which, in turn, pivotally displaces said brush arm toward the tire of the bicycle so as to engage said brush with the tire of the bicycle.

15. A bicycle tire scraper according to claim 11, further including a brush stop located at said first end of said arm, said brush stop limiting a radial movement of said brush.

16. A bicycle tire scraper according to claim 11, further including a lateral brush slide attached to said brush, said lateral side movably attaching said brush to said arm so as to limit an axial movement of said brush relative to said arm and, in turn, relative to the bicycle tire.

* * * * *